United States Patent [19]
He et al.

[11] Patent Number: 6,054,781
[45] Date of Patent: Apr. 25, 2000

[54] VOLTAGE BUS FILTERING SCHEME FOR A BATTERY POWER PLANT

[75] Inventors: Jin He, Plano; Frank H. Chavez, Dallas, both of Tex.

[73] Assignee: Lucent Technologies, Inc., Murray Hill, N.J.

[21] Appl. No.: 09/121,451

[22] Filed: Jul. 24, 1998

[51] Int. Cl.[7] .................................................. H02J 1/02
[52] U.S. Cl. ................................................ 307/105; 363/47
[58] Field of Search .............................. 307/105, 64, 66, 307/85–87, 46, 48; 333/12, 167, 172, 175, 176; 363/47

[56] References Cited

U.S. PATENT DOCUMENTS

| | | | |
|---|---|---|---|
| 2,836,784 | 5/1958 | Gross | 363/47 |
| 3,746,963 | 7/1973 | VeNard, II | 333/12 |
| 4,992,060 | 2/1991 | Meyer | 333/12 |
| 5,654,591 | 8/1997 | Mabboux et al. | 307/66 |
| 5,844,790 | 12/1998 | Jacobs et al. | 363/47 |
| 5,856,712 | 1/1999 | Suzuki et al. | 307/66 |

*Primary Examiner*—Richard T. Elms
*Attorney, Agent, or Firm*—Locke Liddell & Sapp LLP

[57] ABSTRACT

A filter scheme for a battery power plant for supplying power to a load includes positive and negative voltage bus bars each having an input and an output, the output adapted to be connected to the load. A capacitor is connected between the bus bars adjacent to the output of power plant, and an inductor is connected to either one of the bus bars adjacent to the output of the power plant to reduce bus voltage transients.

11 Claims, 1 Drawing Sheet

VOLTAGE BUS FILTERING SCHEME FOR A BATTERY POWER PLANT

TECHNICAL FIELD OF THE INVENTION

The present invention relates to a battery power plant voltage bus, and more particularly to a filter scheme for a bus to reduce voltage transients.

BACKGROUND OF THE INVENTION

Switch-mode rectifiers (SMRs) have been used in telecommunications applications to provide a regulated 24 volt or 48 volt power source for communication switching systems and to charge back-up battery banks. Multiple SMRs along with the battery banks, a controller and a low voltage load disconnect (LVLD) device, such as a contactor or circuit breaker, are housed in a metal enclosure, usually referred to as a bay or a power plant. Multiple SMRs in one bay form a redundant power system. Because of the nature of telecommunications systems, the SMRs have been designed to be capable of "hot" pluggable. The power plant must maintain operation in the event that any one of the SMRs fail. When changing the failed SMR or during "hot" insertion, the power plant must continue to operate and to meet specified requirements. One such requirement is that the power plant output voltage measured at the point of plant regulation not overshoot or undershoot a specified percentage of the regulated power plant output voltage level.

One approach to provide the regulated output voltage during "hot" insertion is that SMRs are normally designed with a pre-charging feature where a long pre-charging metal pin or blade is connected in series with a pre-charging current limiting resistor and a diode. The pre-charging branch is then connected to the output filter capacitor banks of the SMR. The positive terminal of the SMR is intentionally made shorter than the negative terminal and the pre-charging pin as shown in FIG. 1. This configuration provides a short pre-charging time interval to allow the output capacitor bank of the SMR to be pre-charged. The pre-charging of the output capacitor bank minimizes a voltage dip or sag in the plant bus voltage when a SMR is "hot" inserted into the system. The voltage sag or dip may also trigger the SMR under-voltage shutdown.

To address SMR output noise, voice frequency and wide band, and EMI requirements, additional differential mode (Cdm) and common mode (Ccm) filter capacitors are normally required to be connected across the SMR output terminals and between the output terminals and the plant chassis as shown in FIG. 1. Since the SMR positive output terminal is usually connected to the plant chassis in telecommunication applications, the common mode filter capacitor between the negative output terminal and the chassis is "hot" inserted into the low voltage bus, since other SMRs are already connected into the low voltage bus and their positive terminals are connected to the chassis. Regardless of the pre-charging circuit of the hot plug-in SMR, the SMR may still cause output voltage to sag or undershoot, exceeding the specified system requirements. This undesirable condition is especially true for SMRs with their own output circuit breaker as a pre-charging device and without a pre-charging pin, since the output differential mode and common mode filter capacitors are usually located on the load side of the circuit breaker and the distance between the low voltage bus where the SMR is connected and the SMR output capacitor bank, or local voltage sensing point, is usually quite long. The circuit breaker is normally open during SMR "hot" insertion. The presence of the common mode and differential mode capacitors causes the voltage of the low voltage bus to sag. A voltage sag is experienced at the battery power plant output terminals regardless of battery bank on or off conditions.

A need has thus arisen for a battery power plant bus architecture to improve transient responses under SMR "hot" insertion conditions.

SUMMARY OF THE INVENTION

In accordance with the present invention, a voltage bus filter scheme for a battery power plant for supplying power to a load is provided. The power plant includes positive and negative voltage bus bars each having an input and an output, the output adapted to be connected to the load. An energy storage capacitor or capacitor bank is connected between the bus bars adjacent to the output. An inductor is connected to either one of the bus bars or to the output terminal of rectifiers in the power plant.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
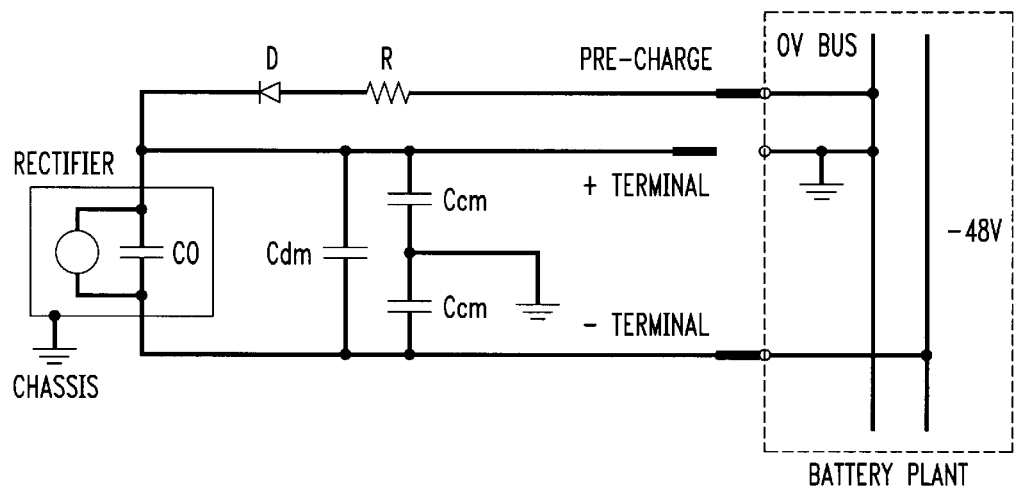
FIG. 1 is a schematic block diagram of a prior art battery power plant with a pre-charging pin.
Figure 2:
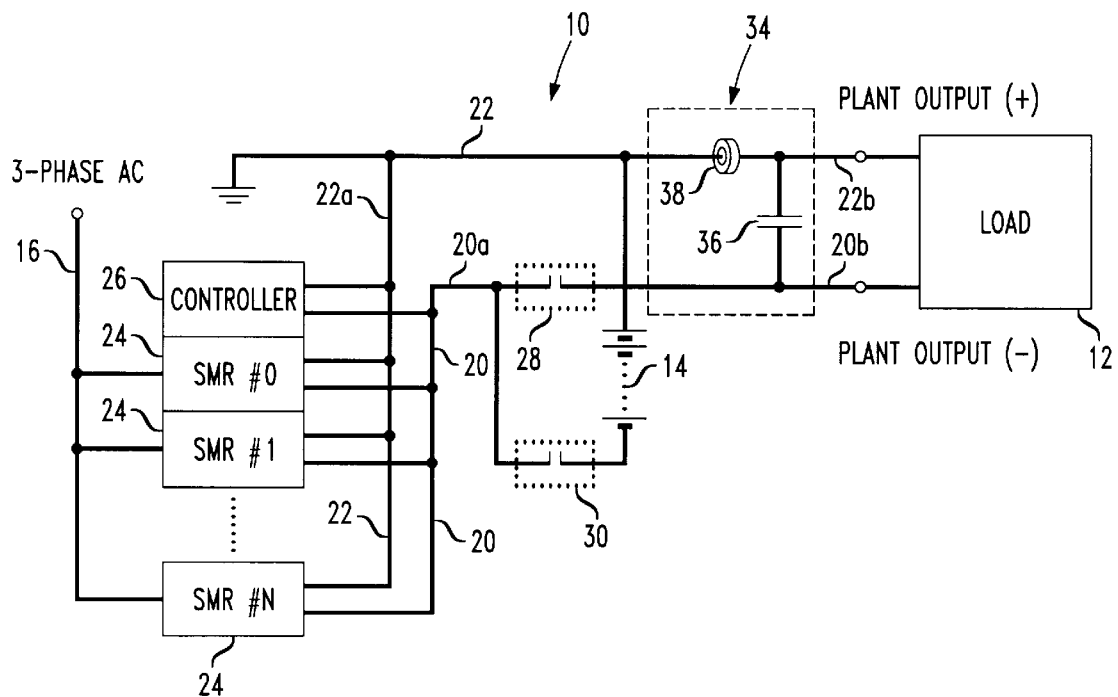
FIG. 2 is a schematic block diagram of the present invention.

Referring to FIG. 2, a battery power plant is illustrated, and is generally identified by the numeral 10. Power plant 10 provides a power source for a load 12 such as, for example, a telecommunications switching system and charges a back-up battery bank 14. Input to power plant 10 is provided by a voltage source 16 such as, for example, a three-phase 50/60 Hz, AC voltage source.

Power plant 10 includes a negative voltage bus 20 having an input 20a and an output 20b. Power plant 10 further includes a positive voltage bus 22 having an input 22a and output 22b. Connected across busses 20 and 22 are a plurality of switch-mode rectifiers (SMRs) 24 for providing a DC output to load 12. A controller 26 is connected across busses 20 and 22. Connected within bus 20 is a low voltage load disconnect device 28. Connected to battery bank 14 is a low voltage battery disconnect device 30.

In accordance with the present invention, a filter, generally identified by the numeral 34 is interconnected between busses 20 and 22. Filter 34 includes a capacitor 36 or bank of capacitors 36 connected across busses 20 and 22 at the output 20b and 22b of busses 20 and 22. Filter 34 further includes one or multiple inductors 38 which are inserted in either bus 20 or bus 22. Filter 34 functions to minimize voltage undershoot and/or overshoot resulting from SMR "hot" insertion. Capacitor 36 which stores the energy ($\frac{1}{2}CV^2$) improves the transient response in the output voltage during "hot" SMR insertion. The value of capacitor 36 is chosen to be approximately, for example, 20 times the value of the equivalent capacitance of the "hot" insertion capacitors of the SMR. Inductor 38 provides additional inductance from that present in the bus between the top SMR 24 in the plant and device 28. Inductor 38 may comprise, for example, one or more ferrite cores located at any location along bus 20 or bus 22 and which encircle bus 20 or bus 22. Inductor 38 is useful for both output EMI suppression and bus filtering purposes.

It therefore can be seen by utilizing the present filter, voltage transients experienced during "hot" insertion of a SMR are substantially reduced.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A battery power plant for supplying DC power to a load comprising:
    a power source including a plurality of switch mode rectifiers and a controller;
    a positive voltage bus bar having an input and an output;
    a negative voltage bus bar having an input and an output;
    said bus bar inputs being adapted to be connected to said power source, and said bus bar outputs being adapted to be connected to the load;
    a capacitor connected between said bus bars adjacent to said output; and
    an inductor connected to one of said bus bars.

2. The battery power plant of claim 1 wherein said inductor is connected adjacent to said output.

3. The battery power plant of claim 1 wherein said inductor comprises a ferrite core encircling one of said bus bars.

4. In a battery power plant for supplying DC power to a load, the power plant having a positive voltage bus bar and a negative voltage bus bar connected to a power source including a plurality of AC switch mode rectifiers and a controller, a filter comprising:
    a capacitor connected between the bus bars adjacent to the load; and
    an inductor connected to one of the bus bars.

5. The battery power plant of claim 4 wherein said inductor is connected adjacent to the load.

6. A battery power plant for supplying DC power to a load from an AC input voltage source comprising:
    a positive voltage bus bar having an input and an output, the output adapted to be connected to the load;
    a negative voltage bus bar having an input and an output, the output adapted to be connected to the load;
    a plurality of AC switch mode rectifiers adapted to be connected to the AC input voltage source and being connected to said input of said bus bars;
    a controller connected to said bus bars for controlling the battery power plant;
    a capacitor connected between said bus bars at said output of said bus bars; and
    an external inductor connected to one of said bus bars.

7. The battery power plant of claim 6 wherein said inductor is connected adjacent to the load.

8. The battery power plant of claim 6 and further including a low voltage load disconnect device connected to one of said bus bars.

9. The battery power plant of claim 6 and further including: a back-up battery connected to said bus bars at said output of said bus bars.

10. The battery power plant of claim 9 and further including a low voltage battery disconnect device connected to said back-up battery.

11. The battery power plant of claim 6 wherein said rectifiers each include a pre-charging terminal.

* * * * *